United States Patent [19]

Ritter

[11] 4,178,524

[45] Dec. 11, 1979

[54] RADIOISOTOPE PHOTOELECTRIC GENERATOR

[76] Inventor: James C. Ritter, 13223 Ingleside Dr., Beltsville, Md. 20705

[21] Appl. No.: 868,246

[22] Filed: Jan. 10, 1978

Related U.S. Application Data

[63] Continuation-in-part of Ser. No. 719,532, Sep. 1, 1976, abandoned.

[51] Int. Cl.$^2$ .............................................. G21D 7/00
[52] U.S. Cl. ............................ 310/304; 136/89 HY; 310/305; 429/5
[58] Field of Search ...................... 310/301, 304, 305; 136/89 HY; 429/5

[56] References Cited

U.S. PATENT DOCUMENTS

| | | | |
|---|---|---|---|
| 2,631,246 | 3/1953 | Christian | 310/304 |
| 2,661,431 | 12/1953 | Linder | 310/305 |
| 3,961,197 | 6/1976 | Dawson | 331/94.5 G |

FOREIGN PATENT DOCUMENTS

| | | | |
|---|---|---|---|
| 1175896 | 4/1959 | France | 310/304 |
| 735847 | 8/1955 | United Kingdom | 310/3 |

OTHER PUBLICATIONS

Gross et al, "Currents From Gammas Make Detectors and Batteries", 3/61, pp. 86–89, Nucleonics, vol. 19, #3.

*Primary Examiner*—Nelson Moskowitz

*Attorney, Agent, or Firm*—R. S. Sciascia; Philip Schneider; Melvin L. Crane

[57] ABSTRACT

This disclosure is directed to a radioisotope photoelectric generator for producing electrical energy. The construction of the generator is similar to that of a well-known storage battery. The generator is composed of alternate layers of high-Z, (high atomic-number) and low-Z(low atomic number) material which are insulated by vacuum or other insulating material. Low-energy photons from a radioactive source interact predominantly with the high-Z material by the photoelectric process, ejecting photoelectrons whose energy extends up to the incident gamma-ray energy E. By selecting the high-Z material thickness to be less than one electron range (at energy E) and the low-Z material thickness to be more than one electron range, there is a net electron transfer from the high-Z plates to the low-Z plates because electrons are emitted predominantly from the high-Z plates and stop in the low-Z plates. After start-up, a potential difference will build up between the high-Z and low-Z plates. An upper limit for this potential difference in kilovolts is the energy E in keV. The high-Z plates are connected together electrically and the low-Z plates are connected together electrically thus forming a "battery." The "battery" delivers power to an external electrical load, preferably but not necessarily a resistor, whose value is chosen to maximize the power delivered to the electrical load, to yield the voltage desired, to control the temperature of the plates, or a combination of such considerations.

15 Claims, 2 Drawing Figures

4,178,524

RADIOISOTOPE PHOTOELECTRIC GENERATOR

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED PATENT APPLICATIONS

This application is a continuation-in-part of application Ser. No. 719,532 filed Sept. 1, 1976, now abandoned.

BACKGROUND OF THE INVENTION

This invention relates to electrical power sources and more particularly to a radioisotope photoelectric generator which may be used as a self-contained remote power source.

Heretofore, various types of electrical generators and batteries have been used for various uses. Remote power sources include such diverse sources as conventional batteries, radioisotope thermoelectric generators (RTG), and solar cell arrays. Batteries have the obvious disadvantage of limited amounts of energy available and thus they must be recharged periodically. Solar cell arrays have many significant advantages (particularly for spacecraft) but even when used with storage cells they cannot supply reliable power on earth because of cloud cover and similar problems.

A highly reliable system for remote applications such as the recent space missions to the outer planets or for remote military requirements is the RTG. The RTG is the most similar power source to the present invention. Both use, as their energy sources, radioactive isotopes and therefore have the potential for very high reliability. The RTG, however, has the disadvantages of low efficiency (~4%) and very high operating temperature required and, for applications where a high voltage source is required, a further conversion from the low voltages produced by the RTG (generally less than 100 volts) to the desired high voltage is required at a further sacrifice in efficiency. As used in this disclosure "high Z" or "high atomic number" is defined as $Z>46$ and "low Z" or "low atomic number" is defined as $Z<23$.

SUMMARY OF THE INVENTION

This device is a remote electrical generator which makes use of radioactive isotopes in combination with high-Z and low-Z materials to generate an electrical output voltage. X rays or gamma rays emitted by the radioactive isotopes produce electrons in the high Z material which are captured by the low-Z material to produce the output energy. The high-Z and low-Z materials alternate and are connected electrically together to form a "battery."

The generator may be used as a high-voltage source or as a remote power source for space vehicles, unattended facilities such as buoys and weather stations, and for military and commercial uses. The device does not depend upon any outside sources; it has long life; it has no moving parts; and it has high reliability and trouble-free operation.

DETAILED DESCRIPTION

Figure 1:
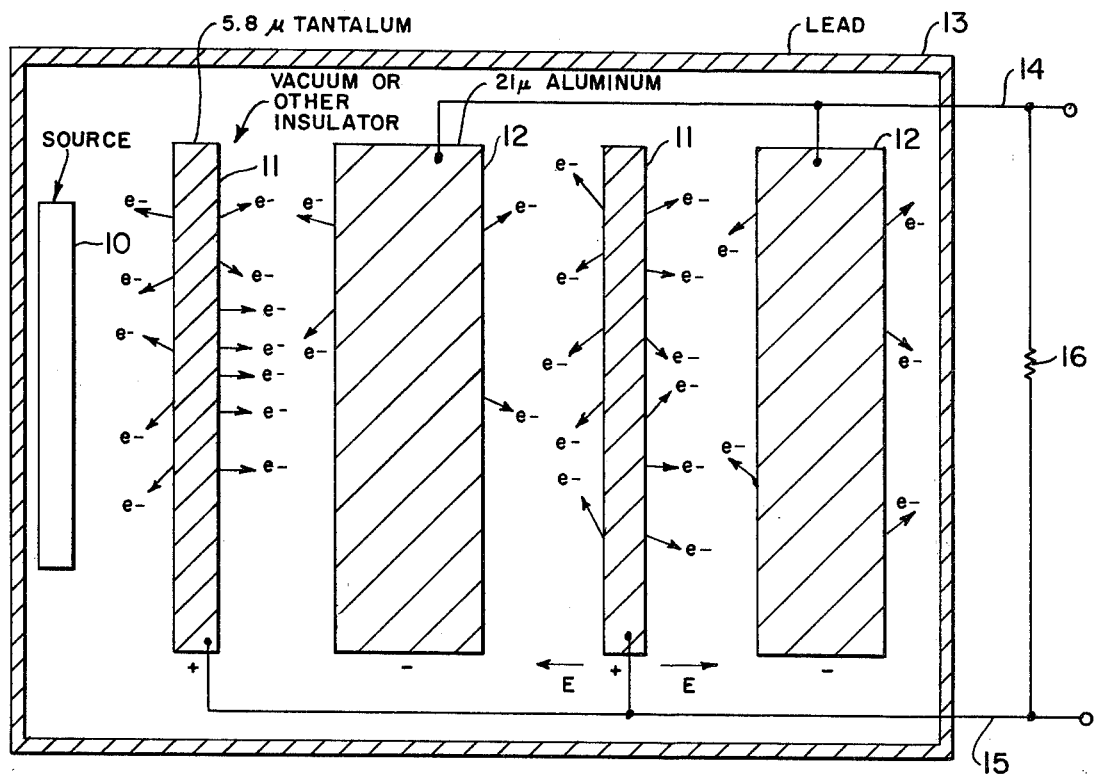
FIG. 1 illustrates the various parts of the generator.

Now referring to the drawing, there is shown by illustration in FIG. 1 a radioisotope photoelectric generator, or "battery," made in accordance with the teaching of this invention. As shown, the battery includes a radioisotope source 10, such as cobalt 57, cadmium 109, tin 199 m, gadolinium 153, or gold 195. These sources emit photons up to approximately 200 keV energy and have the desirable characteristic that they emit no high-energy charged particles. The "battery" is formed by alternate plates of high-atomic number material 11, such as tantalum, lead or gold, and a low-atomic number material 12, such as aluminum or magnesium. Other materials may also be used for the high-Z plate such as bismuth, platinum, iridium, rhenium, tungsten, tin, or silver. Other materials may also be used for the low Z plate such as beryllium, carbon, calcium and titanium.

Plates of like materials are connected to each other electrically and are insulated from the other set of plates by an evacuated spacing or by any suitable material which will not affect the operation thereof.

It should be noted that the high-Z plates may contain one or more elements and the low-Z plates may also contain one or more elements. For example the "high-Z plate" alone might consist of a thick low-Z plate, e.g., aluminum (for structural rigidity) covered on both sides with high-Z material less than one electron range thick. For plates composed of more than one element, the materials within an electron range or less of each surface will determine whether it is a high-Z or a low-Z plate, from the operational standpoint.

The efficiency of operation of the radioisotope photoelectric generator depends strongly on the combination of high- and low-Z materials used. The efficiency is generally higher the further the high-Z and low-Z plates are separated in atomic number.

In order to prevent an outside radiation hazard, the radioisotope source and plates can be contained within a lead housing 13. Electrical leads, 14, 15 are brought out through the housing in order to connect the plates to an electrical load 16. It has been determined that each cell, one tantalum and one aluminum plate, will absorb about 5% of the incident photons for a 50 keV, monoenergetic, gamma ray source, and therefore for a single radioisotope source which emits 50 keV gamma rays, a "battery" may contain about 20 "cells" on each side of the source.

Figure 2:
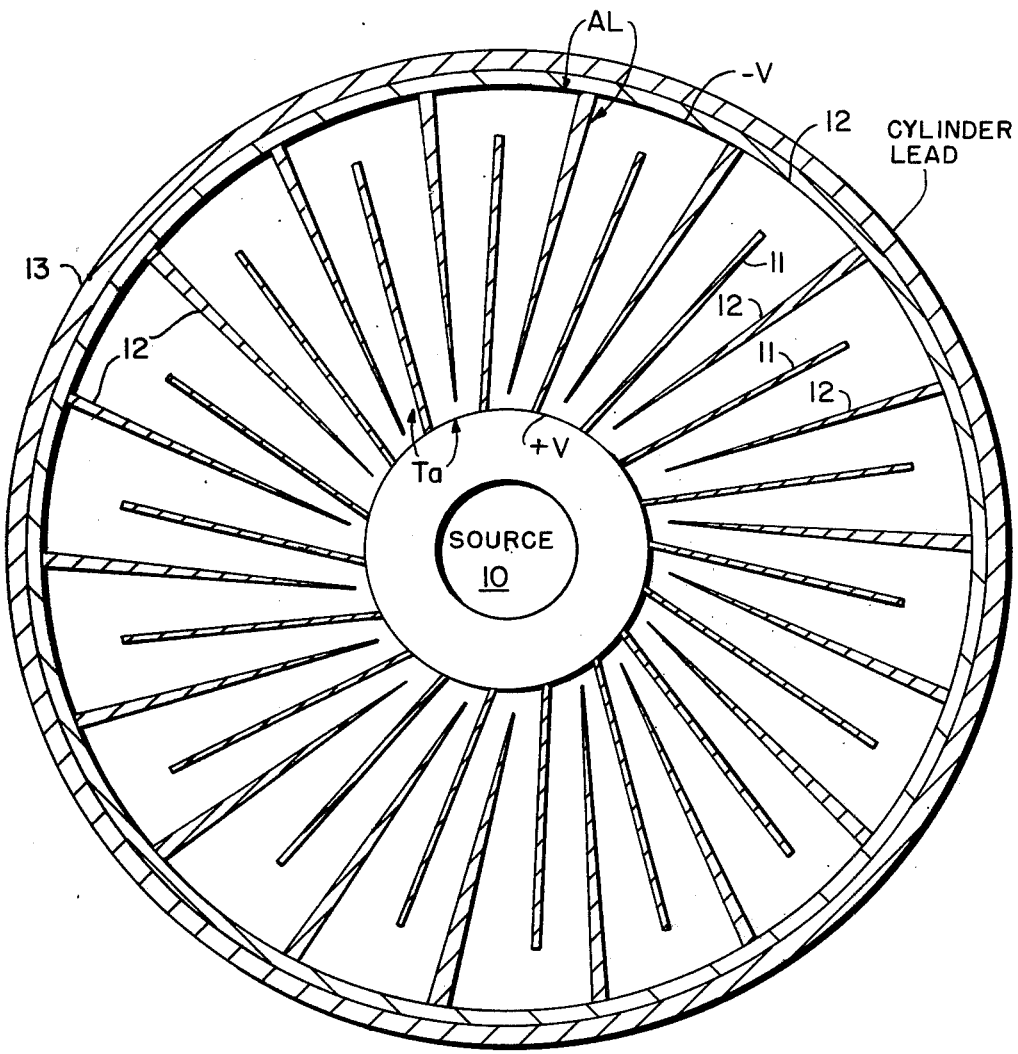
FIG. 2 is a modification of the generator of FIG. 1.

FIG. 2 illustrates a "battery" with the plates pointing almost, but not quite, radially outward from the source 10. The "batteries" illustrated in FIGS. 1 and 2 may be made with more than one radioisotope source, that is, different radioisotope sources with the same or different atomic number and furthermore the radioisotope source may be "seeded" or distributed in the plates or insulating material. With two or more sources, alternate plates are electrically secured to each other the same as in the single-source battery and a larger number of plates may be used. Furthermore, a plurality of batteries may be connected electrically in parallel or in series to provide higher voltage or current or a combination thereof. Instead of a "battery" as shown in FIG. 1 with a single source at one end, the single-source could be placed in the middle between any two plates with alternate plates assembled on opposite sides of the radioisotope source.

In assembly of the device, a radioisotope source which emits X-rays or gamma rays of less than 1 MeV energy is used. The energy is selected to maximize the efficiency of the unit or to determine the voltage of the power source. The unit is most efficient at about 100 KeV gamma ray energy. The amount of power output of the unit is proportional to the amount of radioisotope used. As an illustration: for a 50 keV gamma ray source, the tantalum plate has a thickness of 5.8 microns (one electron range) or less, and the aluminum plate has a thickness of 21 microns (one electron range) or greater, with a spacing between the plates sufficient to avoid breakdown of the insulator used but less than one electron range. The thickness of the lead housing must be sufficient to attenuate the radiation emitted by the source or sources. For most of the above-named sources, less than 0.5 cm of lead is required. The electrical load (for example a resistor) on the outside of the "battery" which will allow a voltage of 25 KV to develop between the plates has a value determined by the amount of isotope present in the battery.

The radioisotope photoelectric generator (RPEG) utilizes a radioisotope which emits X-rays or gamma rays of less than 1 MeV as the energy source. A "battery" is formed by alternate layers of high-Z and low-Z material which are insulated by vacuum or other insulating material as described above and shown in FIGS. 1 and 2. The low-energy photons from the radioactive source interact predominantly with the high-Z material by the photoelectric process, ejecting photoelectrons whose energy extends up to the incident photon energy E (Compton and Auger electrons are also ejected but to a lesser extent). By selecting the thickness of the high-Z material to be less than one electron range (at energy E) and that of the low-Z material to be more than one electron range, there will be a net electron transfer from the high-Z plates to the low-Z plates because electrons are emitted predominantly from the high-Z plates and stop predominantly in the low-Z plates. Photons eject electrons from both high-Z and low-Z materials but a much greater number are ejected from high-Z materials. A potential difference will build up between the high-Z and low-Z plates. An upper limit for this potential difference in kilovolts is the energy E in keV. The high-Z plates are connected electrically together and the low-Z plates are connected electrically together thus forming the "battery." The battery can deliver power to an external electrical load preferably but not necessarily resistive as shown in the figure, the value being chosen to maximize the power delivered to the electrical load, to yield the desired voltage, to control the temperature of the plates, or a combination of such considerations.

It has been determined that with plates as described above and with a source of energy of 50 keV with an electrical load selected to allow 25 KV to develop between the plates, the attenuation of the photons incident on any tantalum plate while traversing the tantalum and adjacent aluminum plate is 5.3% of the incident photons.

It has also been determined that, with the above mentioned 50 keV source, the net charge, Q, transferred to the tantalum plate is:

$$Q = Ne[(\epsilon_{FTa} + \epsilon_{BTa}) - (\epsilon_{FAl} + \epsilon_{BAl})]$$

Where N is the number of photons incident on the plates (attenuation in traversing one set of Ta and Al plates is only 5.3% and is neglected), e is the electron charge, and the $\epsilon$'s are the forward and back emission efficiencies for Al and Ta. Using values from a published article, "X-ray Induced Electron Emission from Metals," by K. W. Dolan, Sandia Laboratory, Sandia Report No. 74-8642, October 1974, one obtains $$Q = 3.8 \times 10^{-3} Ne$$

In traversing one cell of the "battery," the 50 keV photons will be attenuated by 5.3% so the efficiency for converting photons to electrons capable of reaching the alternate plates is simply $$\frac{Q}{e\Delta N} = \frac{3.8 \times 10^{-3} Ne}{.053\, Ne} = 0.072 \frac{\text{electrons transferred}}{\text{photon absorbed}}.$$

The power output per photon absorbed/sec is determined as follows for each cell:

$$P = VI = 25 \times$$

$$10^3 \text{ volts } (0.072 \frac{\text{electrons transferred}}{\text{photons absorbed}}) (R \frac{\text{photon absorbed}}{\text{sec}} \times$$
$$(1.6 \times 10^{-19} \frac{\text{coulombs}}{\text{electrons transferred}}).$$

$$P = 2.9 \times 10^{-16} R \text{ watts,}$$

where R is the number of 50 keV photons absorbed per second. The total energy absorbed per second by the cell from the 50 keV photons is $$(\frac{50 keV}{\text{photon absorbed}}) (1000 \frac{eV}{KeV}) (1.6 \times 10^{-19} \frac{\text{joule}}{eV})$$

$$(R \frac{\text{Photons absorbed}}{\text{sec}}) = 8 \times 10^{-15} R \text{ watts.}$$

Using the power output as estimated above, the efficiency becomes $$\frac{\text{Power Out}}{\text{Power In}} = \frac{2.9 \times 10^{-16} R \text{ watts}}{8 \times 10^{-15} R \text{ watts}} = 0.036 \text{ or } 3.6\%.$$

It must be pointed out that some effects have been neglected in this estimate such as electron absorption in the plates of origin and secondary electron emission from all surfaces. However, the efficiency calculated above is quite attractive and it is a lower limit in the sense that it could be increased substantially by allowing for non-normal incidence of the photon beam (0° would be best) and by making the high-Z plate thinner than 5.8 microns since the photoelectrons are emitted predominantly at 90° to the incident beam at such low photon energies. The photon beam should strike the plates at a small angle to the plates, generally less than 30°.

The effects of secondary electron emission can be substantially reduced by including a screen or grid between the plates and applying a small retarding potential to the screen (about 100 v).

The efficiency of the RPEG has been determined at 3-4% which is an efficiency comparable to present RTG's. However, for ease of calculation in this determination, the photon beam from the radioactive source is assumed normal to the plates (a worst case). The efficiency will be increased substantially by including in the calculation non-normal incidence of the photons incident on the plates at a very small angle by concentrating the source at the center and positioning the plates almost, but not quite, radially outward as shown in FIG. 2. The RPEG, therefore, has a potential advantage of higher efficiency than the RTG's currently in use.

The RPEG develops power at high voltages (typically up to 50 KV) and therefore has the advantage that its output can be set directly at the required voltage for a high-voltage supply rather than requiring a step-up transformer or other device to convert from low to high voltage at a sacrifice in efficiency. The RPEG can be tailored to provide a range of voltages available directly (by selection of different sets of plates and values of electrical load) to provide current limiting, or to control the temperature of the plates.

Another advantage of the RPEG over the RTG is that a large percentage of the electrons' energy is dissipated by the field between the plates rather than being dissipated in heat. This reduces the temperature of the RPEG. This advantage can be enhanced by proper selection of the load impedance, plate and insulator thickness, etc., to minimize the photoelectron energy deposited as heat in the plates and insulators.

The RPEG, like the RTG, can also be used as a combined electrical power and heat source for remote applications such as in the Artic or for deep space missions. The heat output of the RPEG can be selected by choices of load impedance, plate and insulator thickness, etc. The most essential new feature of the RPEG is the use of materials of different atomic number (Z) in a radiation field to develop a potential difference between the plates.

Alternate materials are possible for the dielectric separating the plates. Vacuum or almost any insulator could serve in this role provided it could withstand the high fields. The plates can be almost any high-Z material combined with almost any low-Z material provided that the plates do not melt at high temperature. A screen can be added between the plates with a retarding potential applied to suppress secondary electron emission.

There are several alternative methods of source placement. For example, the source can be placed all at the center, distributed throughout the plates or insulators, or different energy sources can be used in different regions of the RPEG. The thicknesses of the plates can be varied and, for example, the high-Z plate and the insulator could be deposited on a thicker low-Z plate for structural rigidity.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A radioisotope photoelectric generator which comprises:
    a plurality of spaced first plates each of which is formed of a material with an atomic number greater than 46 with each of said first plates connected electrically to each other and having a thickness of less than one electron range at the maximum photon energy;
    a plurality of spaced second plates each of which is formed of a material with an atomic number less than 23 with said second plates alternating with said first plates and connected electrically to each other with each of said second plates having a thickness of more than one electron range at the maximum photon source energy;
    electrical insulation between each of said first and second plates, said insulation having a thickness of less than one electron range at the maximum energy of the photon source;
    one or more grids inserted between each of said first and second plates;
    means for applying a potential to each of said grids to suppress secondary electron emission; and
    a photon—producing radioactive source of energy less than 1 MeV assembled relative to said first and second plurality of plates,
    so that photons produced by said radioactive source interact preferentially with said first plurality of plates to eject electrons therefrom and transfer charge to said second plurality of plates thereby producing a potential between adjacent plates capable of sustaining a current in an electrical load.

2. A radioisotope photoelectric generator which comprises:
    a plurality of spaced first plates each of which is formed of a material with an atomic number greater than 46 with each of said first plates connected electrically to each other and having a thickness of less than one electron range at the maximum photon energy;
    a plurality of spaced second plates each of which is formed of a material with an atomic number less than 23 with said second plates alternating with said first plates and connected electrically to each other with each of said second plates having a thickness of more than one electron range at the maximum photon source energy;
    electrical insulation between each of said first and second plates, said insulation having a thickness of less than one electron range at the maximum energy of the photon source;
    a photon—producing radioactive source of energy less than 1 MeV assembled relative to said first and second plurality of plates,
    so that photons produced by said radioactive source interact preferentially with said first plurality of plates to eject electrons therefrom and transfer charge to said second plurality of plates thereby producing a potential between adjacent plates capable of sustaining a current in an electrical load connected electrically across said first and second plurality of plates and
    the impedances of said electrical load and the plate and insulator thicknesses are selected to adjust the photoelectron energy deposited as heat in the plates and insulation so that the RPEG may be used as a combined heat and electrical power source.

3. A radioactive photoelectric generator as claimed in claim 2 wherein:
    said radioactive source is selected from the group consisting of cobalt 57, cadmium 109, tin 199 m, gadolinium 153, and gold 195.

4. A radioisotope photoelectric generator as claimed in claim 2 wherein:
    more than one different type of radioactive source is used as the photon—producing radioactive source.

5. A radioisotope photoelectric generator as claimed in claim 2 wherein:
    each of said first plates comprises tantalum.

6. A radioisotope photoelectric generator as claimed in claim 2 wherein:
each of said first plates comprises lead.

7. A radioisotope photoelectric generator as claimed in claim 2 wherein:
each of said first plates comprises gold.

8. A radioisotope photoelectric generator as claimed in claim 2 wherein:
each of said second plates comprises aluminum.

9. A radioisotope photoelectric generator as claimed in claim 2 wherein:
each of said second plates comprises magnesium.

10. A radioisotope photoelectric generator as claimed in claim 2 in which:
each of said first plates comprises tantalum, and have a thickness of about 5.8 microns; and
each of said second plates comprises aluminum, and have a thickness of about 21 microns; and
said radioactive source has an energy of about 50 KeV.

11. A radiosiotope photoelectric generator as claimed in claim 2 in which:
each of said first plates comprises a low-Z material to provide structural strength and a surface coating of less than one electron range at the maximum photon energy of high-Z material on both surfaces.

12. A radioisotope photoelectric generator as claimed in claim 2, wherein:
each of said first plates is selected from the group consisting of bismuth, platinum, tungsten, tin, and silver.

13. A radioisotope photoelectric generator as claimed in claim 2 wherein:
each of said second plates is selected from the group consisting of beryllium, carbon, calcium, and titanium.

14. A radioisotope photoelectric generator as claimed in claim 2 wherein:
each of said first plates is selected from the group consisting of iridium and rhenium.

15. A radioisotope photoelectric generator which comprises:
a plurality of spaced first plates each of which is formed of a material with an atomic number greater than 46 with each of said first plates connected electrically to each other and having a thickness of less than one electron range at the maximum photon energy;
a plurality of spaced second plates each of which is formed of a material with an atomic number less than 23 with said second plates alternating with said first plates and connected electrically to each other with each of said second plates having a thickness of more than one electron range at the maximum photon source energy;
electrical insulation between each of said first and second plates, said insulation having a thickness of less than one electron range at the maximum energy of the photon source;
a photon—producing radioactive source of energy less than 1 MeV assembled relative to said first and second plurality of plates;
so that photons produced by said radioactive source interact preferentially with said first plurality of plates to eject electrons therefrom and transfer charge to said second plurality of plates thereby producing a potential between adjacent plates capable of sustaining a current in an electrical load, and
said first plates are positioned relative to said radioactive source such that the photons produced thereby strike said first plates at a small angle to their surfaces.

* * * * *